United States Patent
Yang et al.

(10) Patent No.: US 11,936,588 B2
(45) Date of Patent: Mar. 19, 2024

(54) UCI MULTIPLEXING PROCEDURE FOR MULTIPLE OVERLAPPING CHANNELS AT DIFFERENT PHYSICAL LAYER PRIORITIES

(71) Applicant: APPLE INC., Cupertino, CA (US)

(72) Inventors: Weidong Yang, San Diego, CA (US); Amir Aminzadeh Gohari, Cupertino, CA (US); Chao Jin, San Diego, CA (US); Chunxuan Ye, San Diego, CA (US); Dawei Zhang, Cupertino, CA (US); Hong He, Cupertino, CA (US); Ruoheng Liu, San Diego, CA (US); Sigen Ye, San Diego, CA (US); Wei Zeng, Cupertino, CA (US); Wenshu Zhang, San Diego, CA (US); Yinghui Li, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 284 days.

(21) Appl. No.: 17/593,347

(22) PCT Filed: May 11, 2021

(86) PCT No.: PCT/CN2021/093110
§ 371 (c)(1),
(2) Date: Sep. 16, 2021

(87) PCT Pub. No.: WO2022/236698
PCT Pub. Date: Nov. 17, 2022

(65) Prior Publication Data
US 2023/0224133 A1    Jul. 13, 2023

(51) Int. Cl.
*H04L 5/00* (2006.01)
(52) U.S. Cl.
CPC .......... *H04L 5/0055* (2013.01); *H04L 5/0058* (2013.01)

(58) Field of Classification Search
CPC ... H04L 5/0055; H04L 5/0058; H04L 1/1671; H04L 1/1854; H04L 1/1861; H04L 5/0016
See application file for complete search history.

(56) References Cited

U.S. PATENT DOCUMENTS

| | | | |
|---|---|---|---|
| 2021/0105766 A1* | 4/2021 | Wang | H04W 72/21 |
| 2022/0086849 A1* | 3/2022 | Lee | H04W 72/23 |

(Continued)

FOREIGN PATENT DOCUMENTS

| | | |
|---|---|---|
| WO | 2020056726 A1 | 3/2020 |
| WO | 2020225198 A1 | 11/2020 |
| WO | 2021028872 A1 | 2/2021 |

OTHER PUBLICATIONS

Apple Inc., "Discussions on PUSCH UCI Multiplexing without HARQ-ACK PUCCH in Rel-15", R1-2103079, 3GPP TSG RAN WG1 #104b-e, e-Meeting, Agenda Item 7.1, Apr. 12-20, 2021, 5 pages.

(Continued)

*Primary Examiner* — Christine Ng
(74) *Attorney, Agent, or Firm* — Dorsey & Whitney LLP

(57) ABSTRACT

Performing UCI multiplexing includes generating PUCCH resources Z at an L1 HP procedure and an L1 LP procedure. The L1 HP procedure and the L1 LP procedure results in a plurality of HP PUCCHs and LP PUCCHs, respectively. A modified procedure for Set Q to resources Z is performed with the plurality of HP PUCCHs and LP PUCCHs as inputs. The plurality of HP PUCCHs according to starting (Continued)

symbols is scanned to identify an earliest starting HP PUCCH. A PUCCH from the plurality of LP PUCCHs or HP PUCCHS that overlaps with the earliest starting HP PUCCH is collected. Inter-L1 priority multiplexing is performed on the earliest starting HP PUCCH and the collected PUCCH, which may result in a new HP PUCCH. The new HP PUCCH is inserted into the Set Q. The modified procedure is repeated until there is no overlap among the HP PUCCHs and the LP PUCCHs.

20 Claims, 10 Drawing Sheets

(56) References Cited

U.S. PATENT DOCUMENTS

| | | | | |
|---|---|---|---|---|
| 2023/0006776 | A1* | 1/2023 | Yang | H04L 5/00 |
| 2023/0062724 | A1* | 3/2023 | Zhou | H04L 1/1861 |
| 2023/0125945 | A1* | 4/2023 | Yin | H04W 72/1268 370/329 |
| 2023/0180245 | A1* | 6/2023 | Bae | H04W 72/1268 370/336 |
| 2023/0189278 | A1* | 6/2023 | Ying | H04W 72/23 370/329 |

OTHER PUBLICATIONS

Moderator (OPPO), "Summary#1 of email thread [104b-e-NR-R17-IIoT_URLLC-04]", R1-2103868, 3GPP TSG RAN WG1 #104b-e, e-Meeting, Agenda Item 8.3.3, Apr. 12-20, 2021, 107 pages.

PCT/CN2021/093110, International Search Report and Written Opinion, dated Feb. 11, 2022, 9 pages.

Sharp, "Enhancements on intra-UE UCI multiplexing with different priorities and channel prioritization", R1-2103475, 3GPP TSG RAN WG1 #104-e, e-Meeting, Agenda Item 8.3.3, Apr. 12-20, 2012, 11 pages.

Apple Inc., "UCI multiplexing and PUSCH skipping design in URLLC", R1-2103083, 3GPP TSG-RAN WG1 Meeting #104b-e, e-Meeting, Agenda Item 7.2.5, Apr. 12-20, 2021, 23 pages.

* cited by examiner

UCI MULTIPLEXING PROCEDURE FOR MULTIPLE OVERLAPPING CHANNELS AT DIFFERENT PHYSICAL LAYER PRIORITIES

TECHNICAL FIELD

This application relates generally to wireless communication systems, including uplink control information (UCI) multiplexing.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Uplink control information (UCI) multiplexing in 3GPP Release 15 (Rel-15) NR is oftentimes complex. In 3GPP Release 16 (Rel-16), physical layer (PHY) priority was introduced in relation to UCI multiplexing, which complicates UCI multiplexing further. In 3GPP Release 17 (Rel-17), inter-Layer 1 (inter-L1) priority UCI multiplexing may cause UCI multiplexing's complexity to increase even more.

Accordingly, in some embodiments, it may be desirable to keep as much of the UCI multiplexing design of Rel-16, as possible. However, keeping such design may often not be achievable, as further shown herein. As such, the principles described herein include various solutions to allow for managing the complexity increase of UCI multiplexing in Rel-17.

Notably, the following items may be considered: 1. For transmission (Tx) of UCIs: a. sim Tx of PUCCH/PUSCH; and b. PUCCH carrier switching; 2. For UCI multiplexing: a. inter-priority multiplexing; and b. PHY cancellation of DG/CG; 3. For Hybrid automatic repeat request (HARQ) codebook construction: a. Semi-persistent scheduling (SPS) HARQ deferral; b. retransmission of cancelled HARQ; c. Type 1 sub-slot HARQ codebook enhancement; and d. SPS HARQ skipping; and 4. For physical channel design of PUCCH: a. PUCCH sub-slot repetition; and b. PUCCH F0/F2 inter-sub-slot repetition.

Importantly for UCI multiplexing in Rel-17, is the decision whether the Rel-16 L1 priority-specific UCI multiplexing design is used as the baseline or a L1 priority-agnostic UCI multiplexing design similar to that in Rel-15 is used as the baseline. Considering L1 priority based UCI prioritization and inter-L1 priority UCI multiplexing may need to be supported at the same time: 1. The current agreements on intra-UE multiplexing cover HARQ/SR multiplexing only, (i.e., CSI is excluded in the consideration). Accordingly, UCI-type specific treatment with prioritization or multiplexing has to be considered; 2. Under some conditions, inter-L1 priority multiplexing may be very difficult due to processing time; and 3. If the processing flow for multiplexing is to a large degree shared with that of prioritization, then both specification effort and implementation/test effort can be reduced.

Figure 1:
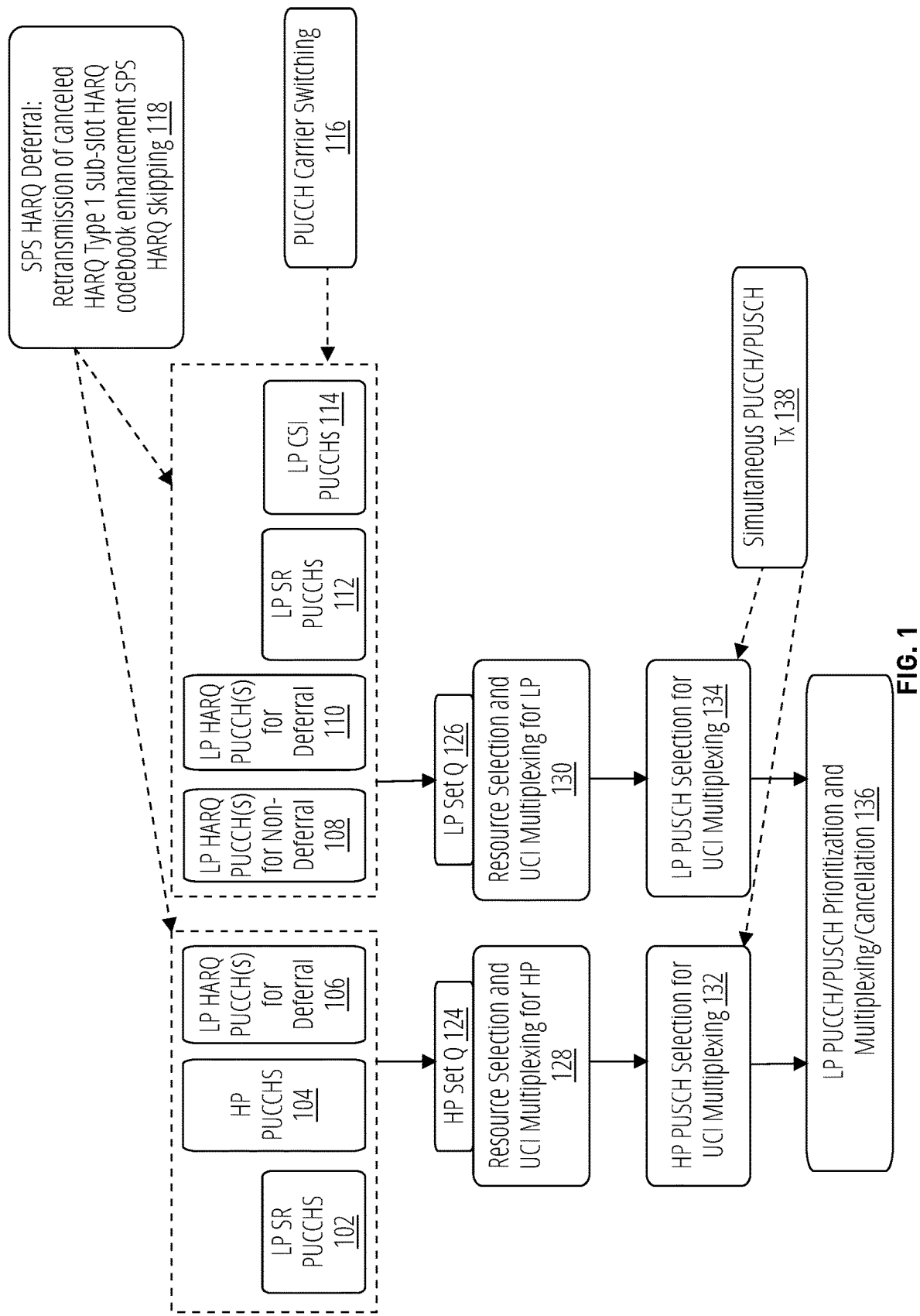
FIG. 1 illustrates an example UCI multiplexing processing flow in accordance with one embodiment.

With these considerations, FIG. 1 illustrates a possible UCI multiplexing processing flow for Rel-17. As shown, FIG. 1 includes block 118 representing SPS HARQ deferral, which includes retransmission of canceled HARQ Type 1 sub-slot HARQ codebook enhancement SPS HARQ skipping. In addition, FIG. 1 includes LP SR PUCCHs 102, HP PUCCHs 104, and LP HARQ PUCCH(s) for deferral 106, each of which may be used to create high priority (HP) Set Q 124. Similarly, FIG. 1 includes LP HARQ PUCCHs for non-deferral 108, LP HARQ PUCCHs for deferral 110, LP SR PUCCHs 112, and LP CSI PUCCHs 114, each of which may be used to create low priority (LP) Set Q 126. In addition, PUCCH carrier switching may also occur with respect to these PUCCHs (e.g., LP SR PUCCHs 102, HP PUCCHs 104, and so forth), as represented by block 116. Resource selection and UCI multiplexing for HP and LP may then be performed, as represented by block 128 and block 130, respectively.

HP PUSCH and LP PUSCH selection for UCI multiplexing may then be performed, as represented by block 132 and block 134, respectively. Simultaneous PUCCH/PUSCH transmission with respect to both the HP procedure (i.e., at block 132) and the LP procedure (i.e., at block 134) may occur, as represented by block 138. Finally, LP PUCCH/PUSCH prioritization and multiplexing/cancellation may then occur, as represented by block 136. Accordingly, the UCI multiplexing processing flow of FIG. 1 includes: 1. Performing, per-L1 priority, multiplexing over PUCCH first; 2. Within the same L1 priority, selecting PUSCH, if any, for UCI multiplexing; and 3. Performing prioritization between L1 priorities.

Figure 2:
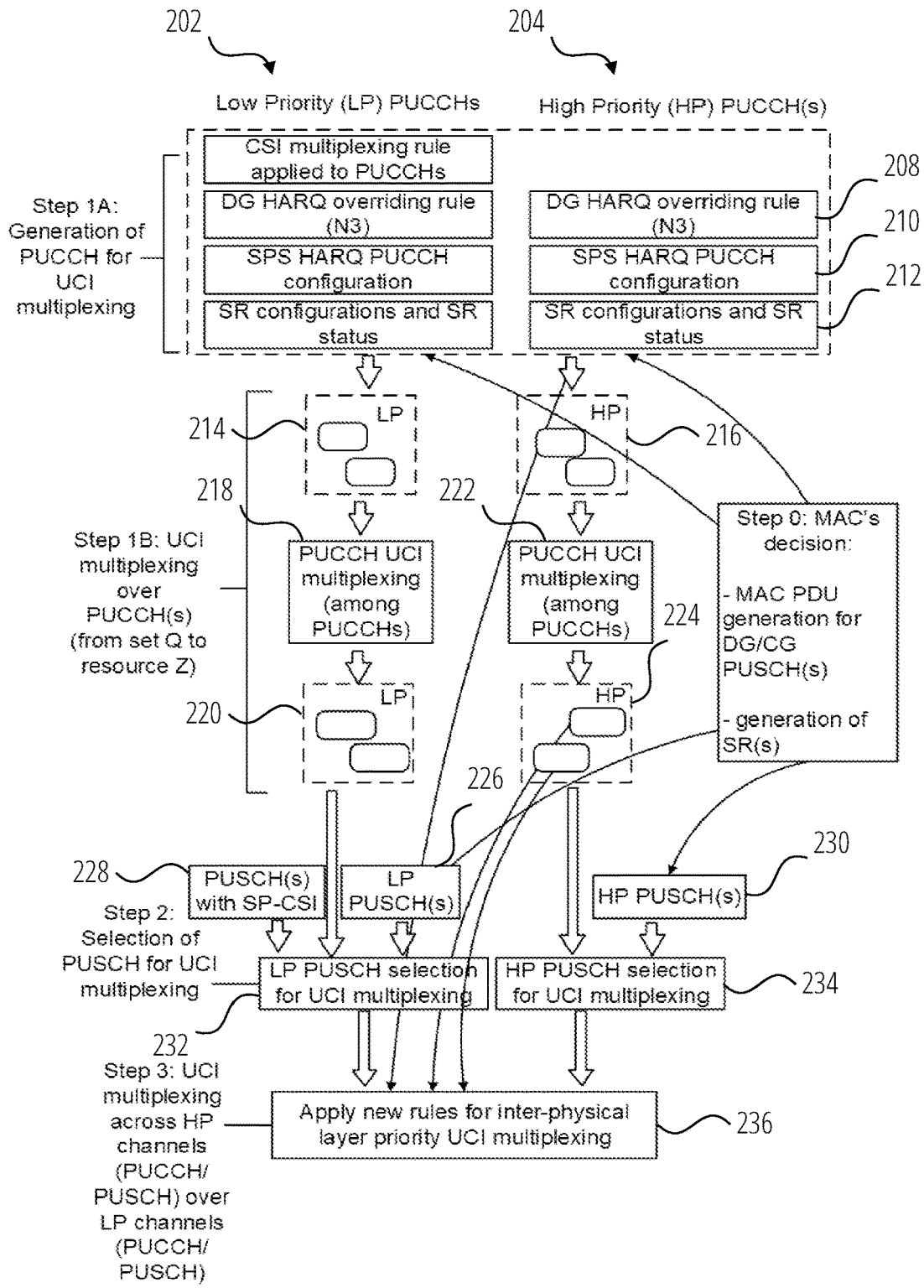
FIG. 2 illustrates an example UCI multiplexing processing flow in accordance with one embodiment.

FIG. 2 is a block diagram illustrating UCI multiplexing according to certain designs. As shown, processing includes separate sub-processes for LP processing 202 and HP processing 204. As understood by skilled persons from the disclosure herein, both the LP processing 202 and the HP processing 204 include, as input to UCI multiplexing, a process 206 for applying CSI multiplexing rules to PUCCHs (including P/SP PUCCHs for CSI reporting), a process 208 for applying a DG HARQ overriding rule (N3) (see, e.g., section 9.2.3 of 3GPP Technical Specification (TS) 38.213), and a process 210 for SPS HARQ PUCCH configuration to determine PUCCH resource(s) for SPS HARQ reporting. The process 210 may include determining a PUCCH for dynamic HARQ reporting indicated by PRI in an downlink DCI, wherein the PUCCH overriding rule for two or more PUCCHs for dynamic HARQ reporting is executed so there is only a single PUCCH for dynamic HARQ reporting as an input to the multiplexing block.

In certain situations, the input to the UCI multiplexing may also include a process 212 for determining or assuming SR configurations and SR status, which as disclosed herein may be different for different embodiments. In the example shown in FIG. 2, in Step 0, the UE's MAC layer (which may be referred to herein as a "MAC entity" or simply the "MAC") makes decisions on DG/CG overriding, CG/CG overriding, and generation of SR(s), and indicates the decisions to the UE's PHY (which may be referred to herein as a "PHY entity"). The remaining processes shown in FIG. 2 concerning UCI multiplexing are internal to the PHY.

In Step 1A shown in FIG. 2, for LP and HP, the PHY performs generation of PUCCH for UCI multiplexing and may include the process 206, the process 208, the process 210, and the process 212, as further described herein.

In Step 1B shown in FIG. 2, for LP and HP, the PHY performs UCI multiplexing over PUCCH(s) from a set Q of PUCCH resources to a PUCCH resource Z. As shown, LP channels 214 prior to UCI multiplexing and HP channels 216 prior to UCI multiplexing may respectively include overlapping PUCCH resources. The PHY performs a process 218 for PUCCH UCI multiplexing among the overlapping PUCCHs of the LP channels 214 to generate an LP PUCCH resource Z 220 from a set Q of PUCCH resources. Similarly, the PHY performs a process 222 for PUCCH UCI multiplexing among the overlapping PUCCHs of the HP channels 216 to generate an HP PUCCH resource Z 224 from the set Q of PUCCH resources. The process 218 and the process 222 for PUCCH UCI multiplexing is described, for example, in section 9.2.5 of 3GPP TS 38.213.

In Step 2 shown in FIG. 2, when conditions are met, the PHY performs a process 232 for LP PUSCH selection for UCI multiplexing among the LP PUCCH resource Z 220, LP PUSCH(s) 226, and PUSCH(s) with SP-CSI 228. The PHY also performs a process 234 for HP PUSCH selection for UCI multiplexing among the HP PUCCH resource Z 224 and other HP PUSCH(s) 230. With carrier aggregation, the selected PUSCH can be a DG PUSCH, CG PUSCH, semi-persistent (SP)-CSI carrying PUSCH, etc. on the same component carrier (CC) as PUCCH or on another CC. In certain implementations, different subcarrier spacing across CCs may complicate the selection procedure. In Step 3 shown in FIG. 2, the PHY may perform multiplexing across HP channels (PUCCH/PUSCH) over LP channels (PUCCH/PUSCH). As part of such, the PHY may apply new rules for inter-physical layer priority UCI multiplexing, as represented by block 236. Notably, previous versions of the UCI multiplexing procedures similar to FIG. 2 may have included cancellation of LP PUCCH/PUSCH by HP PUCCH/PUSCH in place of applying new rules for inter-physical layer priority UCI multiplexing.

A fundamental design problem of UCI multiplexing may lie in the order of multiplexing of PUCCHs, multiplexing over PUSCH, and inter-physical layer priority prioritization/simultaneous PUCCH/PUSCH transmission. Various scenarios are identified and discussed in FIG. 3 to FIG. 6 to illustrate various issues that can occur when using the processing flow of FIG. 2. In addition, to further complicate UCI multiplexing, NR allows two PUCCHs in a slot in Rel-15 (i.e., short+short, short+long), while Rel-16 further expands per physical layer priority, as follows: 1. Two PUCCHs are allowed in the same slot if a slot-based PUCCH configuration is used for a given physical layer priority (e.g., for LP PUCCHs); and 2. Two PUCCHs are allowed in the same sub-slot if a sub-slot-based PUCCH configuration is used for a given physical layer priority (e.g., for HP PUCCHs).

Figure 3:
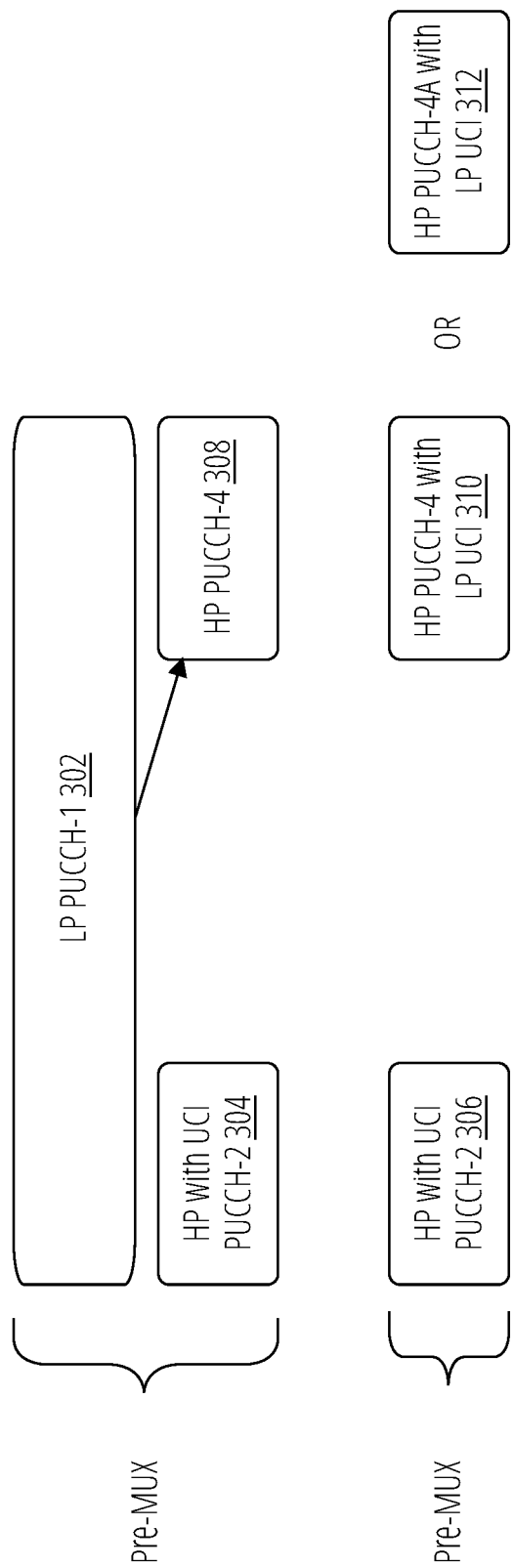
FIG. 3 illustrates an example UCI multiplexing scenario in accordance with one embodiment.

FIG. 3 illustrates a first scenario of UCI multiplexing having an LP PUCCH-1 302 of long duration in addition to multiple HP PUCCHs (i.e., HP with UCI PUCCH-2 304, HP with UCI PUCCH-2 306, HP PUCCH-4 308, HP PUCCH-4 with LP UCI 310, and HP PUCCH-4A with LP UCI 312). Notably, the last overlapping HP PUCCH (i.e., HP PUCCH-4 with LP UCI 310) may be used for inter-L1 priority multiplexing.

In the scenario of FIG. 3, two HP PUCCHs (i.e., two HP PUCCH resources Z, which do not overlap with any HP PUSCH, PUCCH-2 and PUCCH-4 survive PUSCH multiplexing) overlap with an LP PUCCH (i.e., a PUCCH resource Z (PUCCH-1), which does not overlap with any LP PUSCH, survives PUSCH multiplexing). As such, one possible rule may include the LP UCI being multiplexed over the latest HP PUCCH. In some embodiments, however, the combined HP & LP UCI bits may exceed the capacity of PUCCH-4. Accordingly, such embodiments may result in choosing another HP PUCCH (e.g., HP PUCCH-4A with LP UCI 312) for multiplexing. However, allowing HP PUCCH to move around can also be problematic. For instance, HP PUCCH-4A with LP UCI 312 may overlap with an HP PUSCH note shown in the illustration in such scenarios, which may lead to re-running the PUSCH multiplexing procedure.

Figure 4:
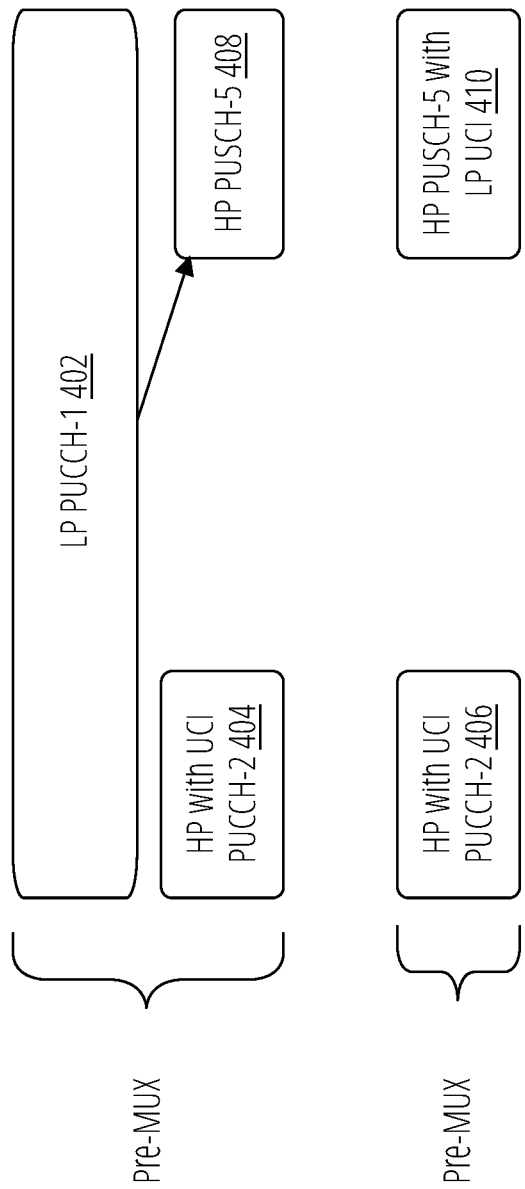
FIG. 4 illustrates an example UCI multiplexing scenario in accordance with one embodiment.

FIG. 4 illustrates a second scenario of UCI multiplexing, which has an LP PUCCH-1 402 of long duration in addition to HP PUCCHs and HP PUSCHs (i.e., HP with UCI PUCCH-2 404, HP with UCI PUCCH-2 406, HP PUSCH-5 408, and HP PUSCH-5 with LP UCI 410). Notably, the last overlapping HP PUSCH (i.e., HP PUSCH-5 with LP UCI 410) may be used for inter-L1 priority multiplexing. When there are two choices for UCI multiplexing (e.g., PUCCH-2 or PUSCH-5), from the point of view of LP UCI, it may be a difficult choice.

Figure 5:
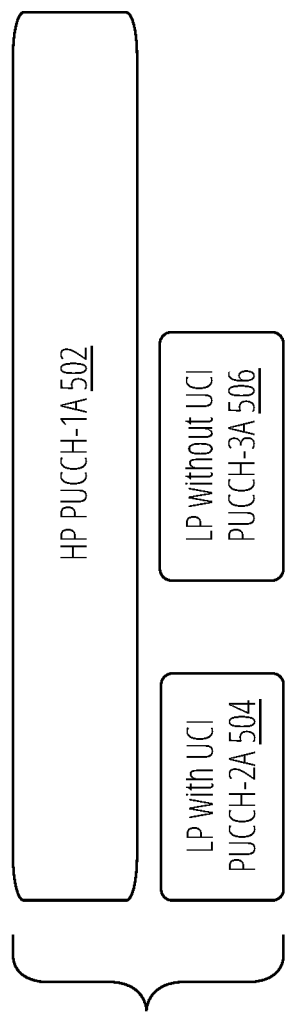
FIG. 5 illustrates an example UCI multiplexing scenario in accordance with one embodiment.

FIG. 5 illustrates a third scenario of UCI multiplexing, which has an HP PUCCH-1A 502 of long duration in addition to multiple LP PUCCHs and LP PUSCHs (i.e., LP with UCI PUCCH-2A 504 and LP without UCI PUCCH-3A 506). Notably, the LP PUCCH with HARQ may be used for inter-L1 priority multiplexing. In field deployment, this case may not arise often. However, a solution for such cases is still provided herein.

Figure 6:
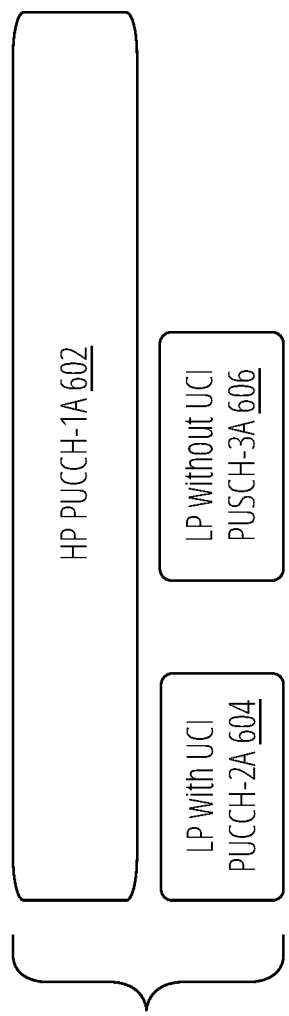
FIG. 6 illustrates an example UCI multiplexing scenario in accordance with one embodiment.

FIG. 6 illustrates a fourth scenario of UCI multiplexing, which has an HP PUCCH-1A 602 of long duration in addition to LP PUCCHs and LP PUSCHs (i.e., LP with UCI PUCCH-2A 604 and LP without UCI PUSCH-3A 606). Once again, in field deployment, this case may not arise often. However, a solution for such cases is still provided herein.

With the proposed flow of FIG. 2, it may be possible to include all PUCCHs, irrespective of their physical layer priorities, in Set Q. Essentially the Rel-15 Q set to PUCCH resource Z procedure is modified to support inter-physical layer priority multiplexing. However, handling of PUCCH with LP CSI only and PUCCH with HP CSI only may arise quite early on in the multiplexing process, which can be avoided if LP PUCCH carrying the LP CSI (one of the LP PUCCH resource Z) and HP PUCCH carrying the HP CSI (one of the HP PUCCH resource Z) don't overlap. Also considering the interaction between the inter-physical layer priority multiplexing feature and the simultaneous PUCCH/PUSCH transmission feature, if HP UCIs can be carried on one carrier, and LP UCIs can be carried on another carrier, it is beneficial to support Rel-17 inter-physical layer priority multiplexing as an add-on to the Rel-16 UCI multiplexing procedure, which handles PUCCH multiplexing separately for different physical layer priorities. From these considerations, the processing flow of FIG. 7 may provide a solution.

Note in Rel-16, periodic CSI over PUCCH and semi-persistent CSI over PUCCH are both at LP. Accordingly, such does not appear in the HP PUCCH multiplexing flow of FIG. 7. Considering Rel-17 URLLC CSI feedback enhancement is still under discussion, its potential presence is included in the processing flow (as represented by process 702). PUSCH(s) with SP-CSI is of LP in the Rel-16 URLLC design. Also out of the consideration of Rel-17 URLLC CSI feedback enhancement, PUSCH(s) with SP-CSI may be associated with HP in Rel-17 (as represented by PUSCH(s) with SP-CSI 706).

Figure 7:
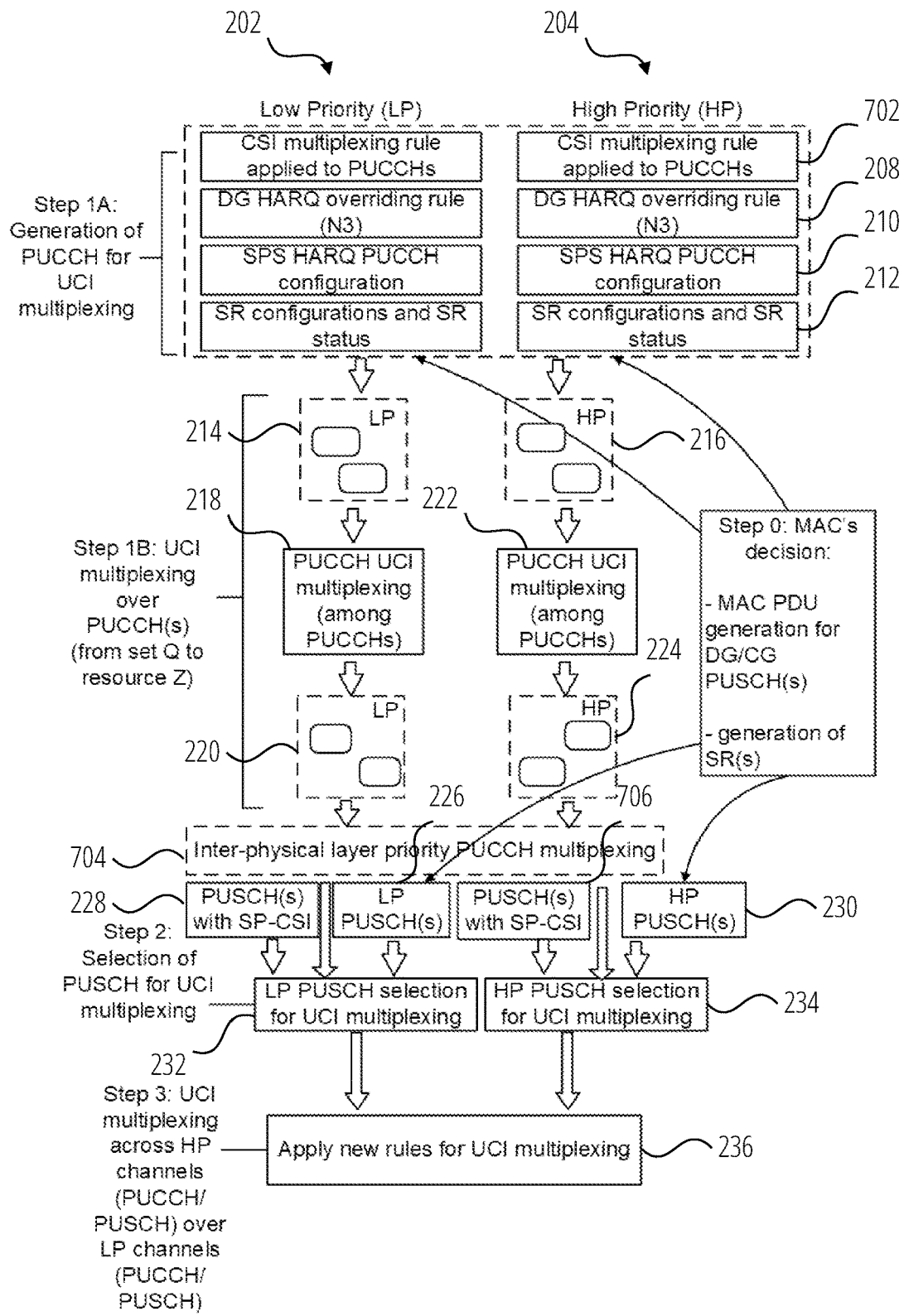
FIG. 7 illustrates an example UCI multiplexing processing flow in accordance with one embodiment.

In addition, PUSCH multiplexing at HP or LP is generally to be executed once at most. As such, PUCCHs are to be frozen when PUSCH multiplexing begins. To achieve such, the UCI multiplexing flow from Rel-16 (i.e., as generally illustrated in FIG. 1) may be changed by introducing "inter-physical layer priority PUCCH multiplexing" between regular PUCCH resource Z generation and PUSCH multiplexing (which may also be referred to as "modified procedure for Set Q→resource Z"). Accordingly, FIG. 7 is a block diagram illustrating UCI multiplexing similar to the UCI multiplexing flow shown in FIG. 1, with the addition of new rules for inter-physical layer priority UCI multiplexing and Inter-physical layer priority PUCCH multiplexing 704. In other words, FIG. 7 may comprise a modified flow configured to handle issues associated with Rel-17.

With the modified flow of FIG. 7, overlapping of PUCCHs at different priorities may already be handled. In particular, the output of the UCI multiplexing procedure of FIG. 7 may generate multiple LP PUCCHs and multiple HP PUCCHs wherein there is no overlap among them (i.e., no overlapping of HP/LP PUCCHs in Set Q from the beginning). In addition, similar to a regular Set Q→Resource Z procedure, no overlapping among PUCCHs may be used as the stop criterion.

Using the flow of FIG. 7, each of the scenarios described in FIG. 3 through FIG. 6 will now be described. For instance, with respect to the scenario of FIG. 3 (i.e., an LP PUCCH of long duration in addition to multiple HP PUCCHs), such scenario may still arise with the modified flow of FIG. 7. Accordingly, the following rules may be used to handle the scenario of FIG. 3: 1. Modifying the 3GPP Technical Specification (TS) 38.213 Set-Q→PUCCH resource Z procedure, including scanning HP PUCCHs according to starting symbols. In particular for rule 1, for the earliest starting HP PUCCH (PUCCH-A): a. Collect overlapping LP PUCCHs and select the LP PUCCH with a HARQ-ACK, if any, for UCI multiplexing; and b. Perform inter-L1 priority multiplexing which may result in an HP PUCCH (PUCCH-A') different from PUCCH-A; or 2. Modifying the 38.213 Set Q→PUCCH resource Z procedure, including scanning HP PUCCHs according to starting symbols. In particular for rule 2, for the earliest starting HP PUCCH (PUCCH-A): a. Collect overlapping LP PUCCHs and select the LP PUCCH with HARQ-ACK, if any, for UCI multiplexing; and 2. Perform inter-L1 priority multiplexing. If doing so may result in an HP PUCCH different from PUCCH-A, then the LP UCI may be discarded (i.e., best effort treatment for LP UCI). Alternatively, such a discarding rule may be defined in an UCI omission portion to ensure the capacity of PUCCH-A is not exceeded.

Using the flow of FIG. 7, each of the scenarios described in FIG. 3 through FIG. 6 will now be described. For instance, with respect to the scenario of FIG. 3 (i.e., an LP PUCCH of long duration in addition to multiple HP PUCCHs), such scenario may still arise with the modified flow of FIG. 7. Accordingly, the following three sets of rules may be used to handle the scenario of FIG. 3. The first set of rules may include: 1. Modifying the 3GPP Technical Specification (TS) 38.213 Set Q→PUCCH resource Z procedure, including: a. Scanning HP PUCCHs according to starting symbols to identify the earliest starting HP PUCCH (PUCCH-A) with at least one overlapping PUCCH. If multiple HP PUCCHs have the same starting symbol, the HP PUCCH with the longest duration is selected (if all of the HP PUCCHs having the same starting symbol also have the same duration, the selection is arbitrary); b. Collecting LP PUCCHs overlapping with the earliest starting HP PUCCH (PUCCH-A); c. Selecting an overlapping LP PUCCH having a HARQ-ACK (and SR and/or CSI, in some embodiments), if any. If any of the collected overlapping LP PUCCHs have more than one UCI type, some can be multiplexed with HP PUCCH and some may be dropped by design (i.e., according to specification, such as LP PUCCHs having a HARQ and a CSI, the CSI is dropped); d. Performing inter-L1 priority multiplexing of the earliest starting HP PUCCH and the selected LP PUCCH, which may result in a new HP PUCCH (PUCCH-A') that is different than PUCCH-A (i.e., the earliest starting HP PUCCH); e. Inserting the new HP PUCCH (PUCCH-A') back into Set Q; and f. Repeating the above modified procedure until there are no overlapping HP PUCCHs and LP PUCCHs.

The second set of rules may include: 1. Modifying the 3GPP TS 38.213 Set Q→PUCCH resource Z procedure, including: a. Scanning HP PUCCHs according to starting symbols to identify the earliest starting HP PUCCH (PUCCH-A) with at least one overlapping PUCCH. If multiple HP PUCCHs have the same starting symbol, the HP PUCCH with the longest duration is selected (if all of the HP PUCCHs having the same starting symbol also have the same duration, the selection is arbitrary); b. Collecting LP PUCCHs overlapping with the earliest starting HP PUCCH (PUCCH-A); c. Selecting an overlapping LP PUCCH having a HARQ-ACK (and SR and/or CSI, in some embodiments), if any. If any of the collected overlapping LP PUCCHs have more than one UCI type, some can be multiplexed with HP PUCCH and some may be dropped by design (i.e., according to specification, such as LP PUCCHs having a HARQ and a CSI, the CSI is dropped); d. Performing inter-L1 priority multiplexing of the earliest starting HP PUCCH and the selected LP PUCCH, which may result in a new HP PUCCH (PUCCH-A') that is different than PUCCH-A (i.e., the earliest starting HP PUCCH). In addition, the new HP PUCCH may start earlier and/or end later than the earliest starting HP PUCCH (PUCCH-A). In such cases, to ensure the capacity of PUCCH-A is never exceeded, an LP UCI may be discarded (i.e., best effort treatment for the LP UCI) or alternatively, an LP UCI discarding rule may be defined with respect to a UCI omission portion; e. Inserting the new HP PUCCH (PUCCH-A') back into Set Q; and f. Repeating the above modified procedure until there are no overlapping HP PUCCHs and LP PUCCHs.

The third set of rules may include: 1. Modifying the 3GPP Technical Specification (TS) 38.213 Set Q→PUCCH resource Z procedure, including: a. Scanning HP PUCCHs according to starting symbols to identify the earliest starting HP PUCCH (PUCCH-A) with at least one overlapping PUCCH. If multiple HP PUCCHs have the same starting symbol, the HP PUCCH with the longest duration is selected (if all of the HP PUCCHs having the same starting symbol also have the same duration, the selection is arbitrary); b. Collecting LP PUCCHs overlapping with the earliest starting HP PUCCH (PUCCH-A); c. Selecting an overlapping LP PUCCH having a HARQ-ACK (and SR and/or CSI, in some embodiments), if any. If any of the collected overlapping LP PUCCHs have more than one UCI type, some can be multiplexed with HP PUCCH and some may be dropped by design (i.e., according to specification, such as LP PUCCHs having a HARQ and a CSI, the CSI is dropped); d. Performing inter-L1 priority multiplexing of the earliest starting HP PUCCH and the selected LP PUCCH, which may result in a new HP PUCCH (PUCCH-A') that is different than PUCCH-A (i.e., the earliest starting HP PUCCH). In addition, the new HP PUCCH may result in a UCI payload that exceeds the capacity of the earliest starting HP PUCCH (PUCCH-A). In such cases, to ensure the capacity of PUCCH-A is never exceeded, an LP UCI may be discarded (i.e., best effort treatment for the LP UCI) or alternatively, an LP UCI discarding rule may be defined with respect to a UCI omission portion; e. Inserting the new HP PUCCH (PUCCH-A') back into Set Q; and f. Repeating the above modified procedure until there are no overlapping HP PUCCHs and LP PUCCHs.

The fourth set of rules may include: 1. Modifying the 3GPP Technical Specification (TS) 38.213 Set Q→PUCCH resource Z procedure, including: a. Scanning HP PUCCHs according to starting symbols to identify the earliest starting HP PUCCH (PUCCH-A) with at least one overlapping PUCCH. If multiple HP PUCCHs have the same starting symbol, the HP PUCCH with the longest duration is selected (if all of the HP PUCCHs having the same starting symbol also have the same duration, the selection is arbitrary); b. Collecting PUCCHs overlapping with the earliest starting HP PUCCH (PUCCH-A); c. Selecting an overlapping LP PUCCH having a HARQ-ACK (and SR and/or CSI, in some embodiments), if any. If any of the collected overlapping LP PUCCHs have more than one UCI type, some can be multiplexed with HP PUCCH and some may be dropped by design (i.e., according to specification, such as LP PUCCHs having a HARQ and a CSI, the CSI is dropped); d. Performing inter-L1 priority multiplexing of the earliest starting HP PUCCH and the selected LP PUCCH, which may result in a new HP PUCCH (PUCCH-A') that is different than PUCCH-A (i.e., the earliest starting HP PUCCH). In addition, the new HP PUCCH may result in a UCI payload that exceeds the capacity of the earliest starting HP PUCCH (PUCCH-A). In such cases, to ensure the capacity of PUCCH-A is never exceeded, an LP UCI may be discarded (i.e., best effort treatment for the LP UCI) or alternatively, an LP UCI discarding rule may be defined with respect to a UCI omission portion; e. Inserting the new HP PUCCH (PUCCH-A') back into Set Q; and f. Repeating the above modified procedure until there are no overlapping HP PUCCHs and LP PUCCHs.

The fifth set of rules may include: 1. Modifying the 3GPP Technical Specification (TS) 38.213 Set Q→PUCCH resource Z procedure, including: a. Scanning HP PUCCHs according to starting symbols to identify the earliest starting HP PUCCH (PUCCH-A) with at least one overlapping PUCCH. If multiple HP PUCCHs have the same starting symbol, the HP PUCCH with the longest duration is selected (if all of the HP PUCCHs having the same starting symbol also have the same duration, the selection is arbitrary); b. Collecting PUCCHs overlapping with the earliest starting HP PUCCH (PUCCH-A); c. Selecting an overlapping LP PUCCH having a HARQ-ACK (and SR and/or CSI, in some embodiments), if any. If any of the collected overlapping LP PUCCHs have more than one UCI type, some can be multiplexed with HP PUCCH and some may be dropped by design (i.e., according to specification, such as LP PUCCHs having a HARQ and a CSI, the CSI is dropped); d. Performing inter-L1 priority multiplexing of the earliest starting HP PUCCH and the selected LP PUCCH, which may result in a new HP PUCCH (PUCCH-A') that is different than PUCCH-A (i.e., the earliest starting HP PUCCH). In addition, the new HP PUCCH does not start earlier than PUCCH-A and/or ends later than PUCCH-A or it is the same as PUCCH-A, to ensure the capacity of PUCCH-A is never exceeded, an LP UCI may be discarded (i.e., best effort treatment for the LP UCI) or alternatively, an LP UCI discarding rule may be defined with respect to a UCI omission portion; e. Inserting the new HP PUCCH (PUCCH-A') back into Set Q; and f. Repeating the above modified procedure until there are no overlapping HP PUCCHs and LP PUCCHs.

Note all the sets of rules can be used to take HP PUCCHs and LP PUCCHs as input directly, without going through the procedure of generating PUCCH resources Z for respective physical layer priorities: in FIG. 7, 218, 222, 220, 224 would be bypassed in those cases.

Note in all sets of rules, the arrangement of HP PUCCHs according to starting symbol and duration can be conducted first, then the test on overlapping with any PUCCH can be conducted next; or arrangement and test can be done jointly.

With respect to the scenario of FIG. 4 (i.e., an LP PUCCH of long duration in addition to HP {PUCCH, PUSCH}), such a scenario may be entirely avoided as overlapping HP/LP PUCCHs may not arise. With respect to the scenario of FIG. 5 (i.e., a long duration HP PUCCH in addition to multiple LP PUCCHs), again such a scenario may be entirely avoided as overlapping HP/LP PUCCHs may be handled by the modified {Set Q→resource Z} procedure already. Finally, with respect to the scenario of FIG. 6 (i.e., a long duration HP PUCCH in addition to LP {PUCCH, PUSCH}), again such a scenario may be entirely avoided as overlapping HP/LP PUCCHs may be handled by the modified {Set Q→resource Z} procedure already.

Furthermore, from a UE processing point of view, some latency issues may occur. For instance, if the resulted HP PUCCH (i.e., the new HP PUCCH or HP PUCCH-A') due to inter-physical layer priority multiplexing has a relatively large difference in timing from the HP PUCCH resource Z at the entrance of the inter-physical layer priority multiplexing procedure, numerous issues may occur. In an example, the UE may not have the HP UCI ready if the new HP PUCCH starts too early. In another example, the HP UCI's latency, if carried over to the new HP PUCCH, may also become too large.

To avoid such latency issues associated with HP UCI due to multiplexing of LP UCI, HP PUCCHs resulting from HP/LP UCI multiplexing may not finish later than an original HP PUCCH. In addition, for URLLC traffic, the processing time for an HP PUCCH can be tight if the resulted PUCCH starts too early, which can pose a challenge to implementation. In addition, in the modified procedure Set Q→resource Z, as illustrated in FIG. 7, if PUCCH-A' ends much later than PUCCH-A and/or starts much earlier than PUCCH-A, then the LP DCI may be discarded.

Accordingly, a number of solutions associated with a UCI multiplexing flow in Rel-17 are provided herein, including: 1. After the procedures of generating PUCCH resource Z at each L1 priority, running a modified procedure for {Set Q→resource Z} with HP & LP PUCCHs as inputs may be utilized. The output from the modified procedure may then be fed to PUSCH multiplexing at each L1 priority; 2. Introducing a cross-L1 priority procedure for {Set Q→Resource Z} with the following two alternatives: a. The resulted HP PUCCH from multiplexing HP & LP UCIs can be different from the initial HP PUCCH; or b. The resulted HP PUCCH from multiplexing HP & LP UCIs is restricted to being the same as the initial HP PUCCH; and 3. A timing condition being included in the modified procedure {Set Q→resource Z}, wherein if PUCCH-A' ends later than PUCCH-A and/or starts earlier than PUCCH-A, then the LP DCI is discarded.

Figure 8:
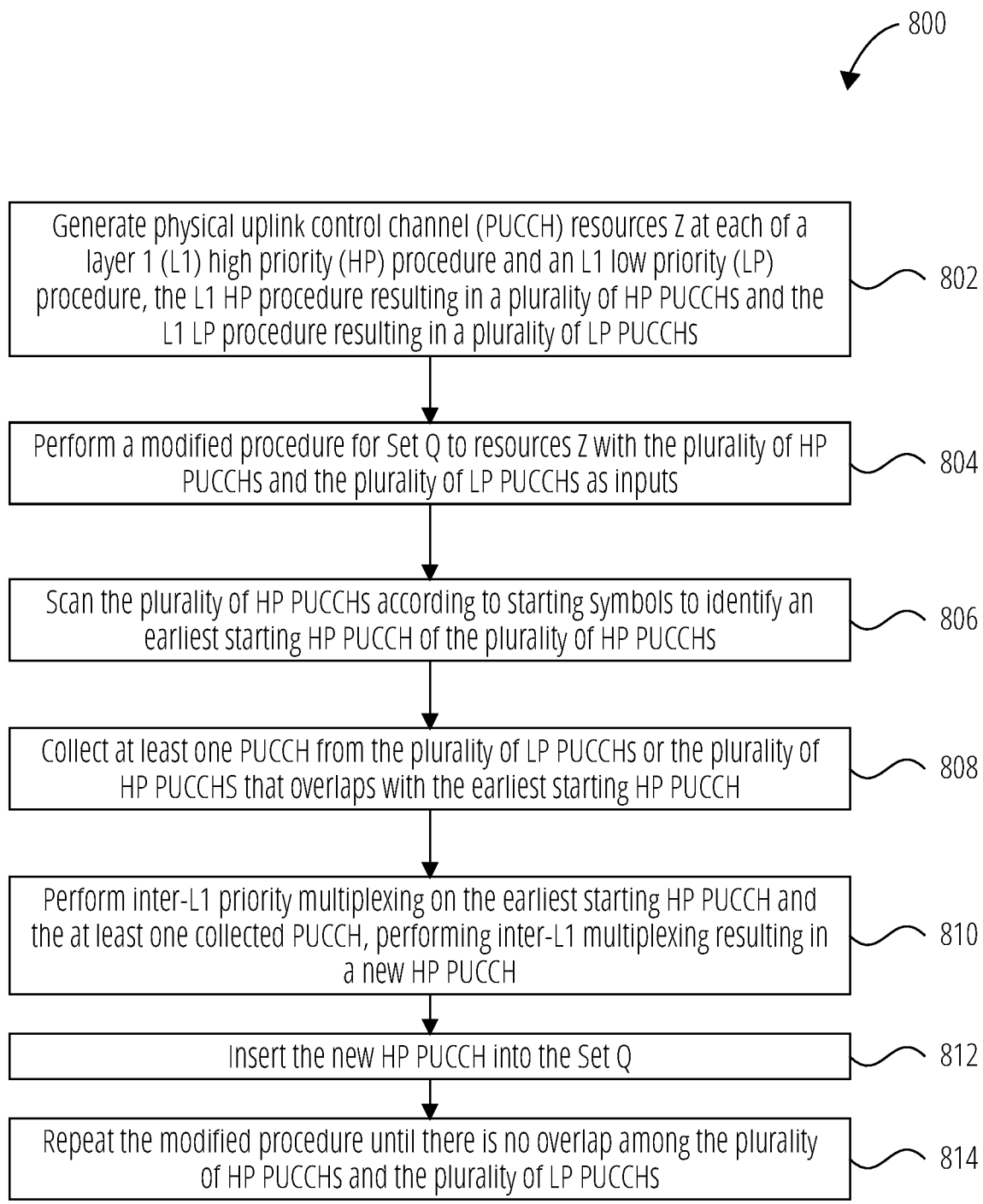
FIG. 8 illustrates a flowchart of a method for UCI multiplexing in accordance with one embodiment.

FIG. 8 illustrates a flowchart of a method 800 for performing UCI multiplexing. In block 802, the method 800 generates physical uplink control channel (PUCCH) resources Z at each of a layer 1 (L1) high priority (HP) procedure and an L1 low priority (LP) procedure. For instance, the LP PUCCH resource Z 220 and the HP PUCCH resource Z 224 of FIGS. 2 and 7. The L1 HP procedure may result in a plurality of HP PUCCHs and the L1 LP procedure may result in a plurality of LP PUCCHs. In block 804, the method 800 performs a modified procedure for Set Q to resources Z with the plurality of HP PUCCHs and the plurality of LP PUCCHs as inputs. For instance, the modified procedure may include the inter-physical layer priority PUCCH multiplexing 704 of FIG. 7.

In block 806, the modified procedure of the method 800 scans the plurality of HP PUCCHs according to starting symbols to identify an earliest starting HP PUCCH of the plurality of HP PUCCHs. For instance, the HP with UCI PUCCH-2 304 and the HP with UCI PUCCH-2 306 of FIG. 3 may be scanned. In block 808, the modified procedure of the method 800 collects at least one PUCCH from the plurality of LP PUCCHs or the plurality of HP PUCCHS that overlaps with the earliest starting HP PUCCH. For example, the LP PUCCH-1 302 of FIG. 3 may be collected.

In block 810, the modified procedure of the method 800 performs inter-L1 priority multiplexing on the earliest starting HP PUCCH and the at least one collected PUCCH. Performing inter-L1 multiplexing may result in a new HP PUCCH. For instance, the at least one collected PUCCH that overlaps with the earliest starting HP PUCCH may be selected for multiplexing with the earliest starting HP PUCCH based on any number of rules as further discussed with respect to FIG. 7. In block 812, the modified procedure of the method 800 inserts the new HP PUCCH into the Set Q. For instance, the new HP PUCCH may be inserted into the Set Q as part of the inter-physical layer priority PUCCH multiplexing 704 of FIG. 7. In block 814, the modified procedure of the method 800 repeats the modified procedure until there is no overlap among the plurality of HP PUCCHs and the plurality of LP PUCCHs. For example, the procedure associated with the inter-physical layer priority PUCCH multiplexing 704 of FIG. 7 described herein may be repeated until overlapping HP PUCCHs and LP PUCCHs have been resolved.

The method 800 may also include the new HP PUCCH being different than the earliest starting HP PUCCH. The method 800 may also include the new HP PUCCH starting earlier or ending later than the earliest starting HP PUCCH. The method 800 may also include the at least one collected PUCCH comprising an LP PUCCH of the plurality of LP PUCCHs having a hybrid automatic repeat request-acknowledgement (HARQ-ACK).

The method 800 may also include the modified procedure further comprising discarding an LP UCI. The method 800 may also include the new HP PUCCH resulting in a UCI payload that exceeds a capacity of the earliest starting HP PUCCH. The method 800 may also include the modified procedure further comprising discarding an LP UCI. The method 800 may also include the at least one collected PUCCH comprising an LP PUCCH that includes at least one of a scheduling request (SR) or channel state information (CSI).

Embodiments contemplated herein include an apparatus comprising means to perform one or more elements of the method 800. This apparatus may be, for example, an apparatus of a UE (such as a wireless device 1002 that is a UE, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a UE (such as a memory 1006 of a wireless device 1002 that is a UE, as described herein).

Embodiments contemplated herein include an apparatus comprising logic, modules, or circuitry to perform one or more elements of the method 800. This apparatus may be, for example, an apparatus of a UE (such as a wireless device 1002 that is a UE, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE (such as a wireless device 1002 that is a UE, as described herein).

Embodiments contemplated herein include a signal as described in or related to one or more elements of the method 800.

Embodiments contemplated herein include a computer program or computer program product comprising instructions, wherein execution of the program by a processor is to cause the processor to carry out one or more elements of the method 800. The processor may be a processor of a UE (such as a processor(s) 1004 of a wireless device 1002 that is a UE, as described herein). These instructions may be, for example, located in the processor and/or on a memory of the UE (such as a memory 1006 of a wireless device 1002 that is a UE, as described herein).

Regarding HARQ/SR multiplexing on PUCCH with a small payload size, there may be alternative solutions for PUCCH format 1, as further discussed herein. By way of background regarding Rel-15 PUCCH format 1 design, For PUCCH format 1, for the $N_{symb}^{PUCCH,1}$ OFDM symbols in a PUCCH, for non intra-slot frequency hopping, no more than half of the $N_{symb}^{PUCCH,1}$ symbols are for carrying UCIs, and no less than half of the $N_{symb}^{PUCCH,1}$ symbols are used for demodulation reference signals (DMRS). DMRS may occupy even-indexed symbols within PUCCH, 0, 2, 4, . . . , whether intra-slot frequency hopping is enabled or not.

To randomize uplink intercell interference, sequence hopping may be used. In general for PUCCH, group hopping (within 30 groups) and sequence hopping (up to two sequences within a group) can be used, and three modes are supported: 1. (no group hopping, no sequence hopping), 2. (group hopping enabled, sequence hopping disabled), and 3. (group hopping disabled, sequence hopping enabled).

For PUCCH format 1, since there is only one physical resource block (PRB) for PUCCH in Rel-15, sequence hopping is disabled. With B52.6, when more PRBs are supported, sequence hopping can be enabled. When intra-slot frequency hopping is disabled, then DMRSsymbol: $w_i(m)$, $r_{u,v}^{(\alpha_l,\delta)}(n)$, m=l/2, l=0, 2, 4 . . . .
Non-DMRSsymbol: $d(0)w_i(m)r_{u,v}^{(\alpha_l,\delta)}(n)$, m=(l−1)/2, l=1, 3, 5, . . . , $$r_{u,v}^{(\alpha_l,\delta)}(n) = a^{j\alpha_l \cdot n} \bar{r}_{u,v}(n), 0 \le n < M_{zc},$$

$$\bar{r}_{u,v}(n) = e^{j\phi_u(n)\pi/4}$$

$$\alpha_l = \frac{\pi}{N_{sc}^{RB}}\left(m_0 + m_{cs} + n_{cs}(n_{s,f}^\mu, l+l')\right) \bmod N_{sc}^{RB}$$

where
δ=0 c.f. 6.3.2.2.1 TS 38.211
$M_{zc}$=12, v=0.
$n_{s,f}^\mu$ is the (numerology/y dependent) slot number in the radio frame
l is the OFDM symbol number in the PUCCH transmission where l=0 corresponds to the first OFDM symbol of the PUCCH transmission
l' is the index of OFDM symbol in the slot that corresponds to the first OFDM symbol of the PUCCH transmission in the slot
$m_0$ is given by initialCyclicShift of PUCCH-format1 for a PUCCH-Resource
the index i for $w_i(m)$ is given by timeDomainOCC of PUCCH-format1 for a PUCCH-Resource, $w_i(m)$ is from a DFT vector given in Table 6.3.2.4.1-2, note the length of the DFT vector for DMRS symbols can be different from that for non-DMRS symbols
$m_{cs}$=0 for PUCCH format 1.
the function $n_{cs}(n_c, l) = \Sigma_{m=0}^7 (8N_{symb}^{slot} \cdot n_c + 8l+m)$ A potential modification on PUCCH format 1 may include When HARQ-ACK and SR over PUCCHs with PUCCH format 1 collide, the channel selection treatment can be problematic in Rel-16 for HARQ-ACK and SR at the same physical layer priority. Further in Rel-17, when HARQ-ACK and SR are at different priorities, the multiplexing design is open, and borrowing a design similar to channel selection would pass the problematic design to Rel-17. Accordingly, a solution may include a PUCCH format 1 multiplexing rule. A key consideration of such is that the resulted PUCCH resource's physical location is not to change as the UCI contents, (i.e., no matter whether the SR is positive or negative, the same physical location is to be used).

For HARQ-ACK and SR multiplexing with modified PUCCH format 1 design, if there is 1 bit for HARQ-ACK and 1 bit for SR, then 2 bits can be mapped to a QPSK symbol d(0). If there are 2 bits for HARQ-ACK and 1 bit for SR, a few solutions can be considered: 1. 8PSK or unequal protection can be used for d(0); 2. If those 2 bits for HARQ-ACK are at LP, the HARQ-ACK may be bundled into 1 bit, so the total UCI bits are 2, and QPSK constellation can be used for d(0); 3. Using a cyclic shift of the base sequence to indicate the status of SR:

Denote $m_0 + m_{cs}$ as $\tilde{m}_{cs}$ $$\alpha_l = \frac{\pi}{N_{sc}^{RB}}\left(\tilde{m}_{cs} + n_{cs}(n_{s,f}^\mu, l+l')\right) \bmod N_{sc}^{RB}$$

$\tilde{m}_{cs}$ can be set to one value for positive SR and another value for negative SR.

In option 1, $\tilde{m}_{cs}=m_0$ for negative SR where $m_0$ is the configured value for the resource Z, $\tilde{m}_{cs}=m_0+m$ for positive SR, where m is a fixed value in specification (e.g., 1).

In option 2, $\tilde{m}_{cs}=m_0$ for negative SR, m is a RRC configured value for the positive SR and $\tilde{m}_{cs}=m_0+m$, the configured value can be per PUCCH format (i.e. a single value for all PUCCHs at format 1 under PUCCH-config), or per PUCCH resource, with that m can be used per-PUCCH resource.

In option 3, m can take one of a number of values to indicates more than 1 bit, e.g. 1, 2, 3 so more than 1 bits can be signalled with the cyclic shift.

In option 4, $\tilde{m}_{cs}$ is determined according to the cyclic shifts of overlapping PUCCH format 1: with two PUCCH resources at PUCCH format 1, there are two $m_0$: and they can be denoted as $m_{0,1}$ and $m_{0,2}$. $m_{0,1}$ or $m_{0,2}$ can be used for negative SR or positive SR respectively if $m_{0,1} \neq m_{0,2}$. However, if $m_{0,1} = m_{0,2}$, an offset like m can be used (e.g., for positive SR).

In another treatment, instead of formulating the design according to UCI types such as HARQ-ACK and SR, the UCIs can be first concatenated into a sequence, from high importance to low importance: 1. With HP SR and LP HARQ-ACK: then it is: [HP SR bit][LP HARQ-ACK bit 1][LP HARQ-ACK bit 2]; 2. With LP SR and HP HARQ-ACK: then it is [HP HARQ-ACK bit 1][HP HARQ-ACK bit 2][LP SR bit]; or 3. With SR and HARQ-ACK at the same priority: then it is [HARQ-ACK bit 1][HARQ-ACK bit 2][SR bit].

A rule can be defined so the MSB is mapped to the cyclic shift, the rest bits are mapped to d(0). Alternatively the LSB is mapped to cyclic shift, and the rest bits are mapped to d(0).

Figure 9:
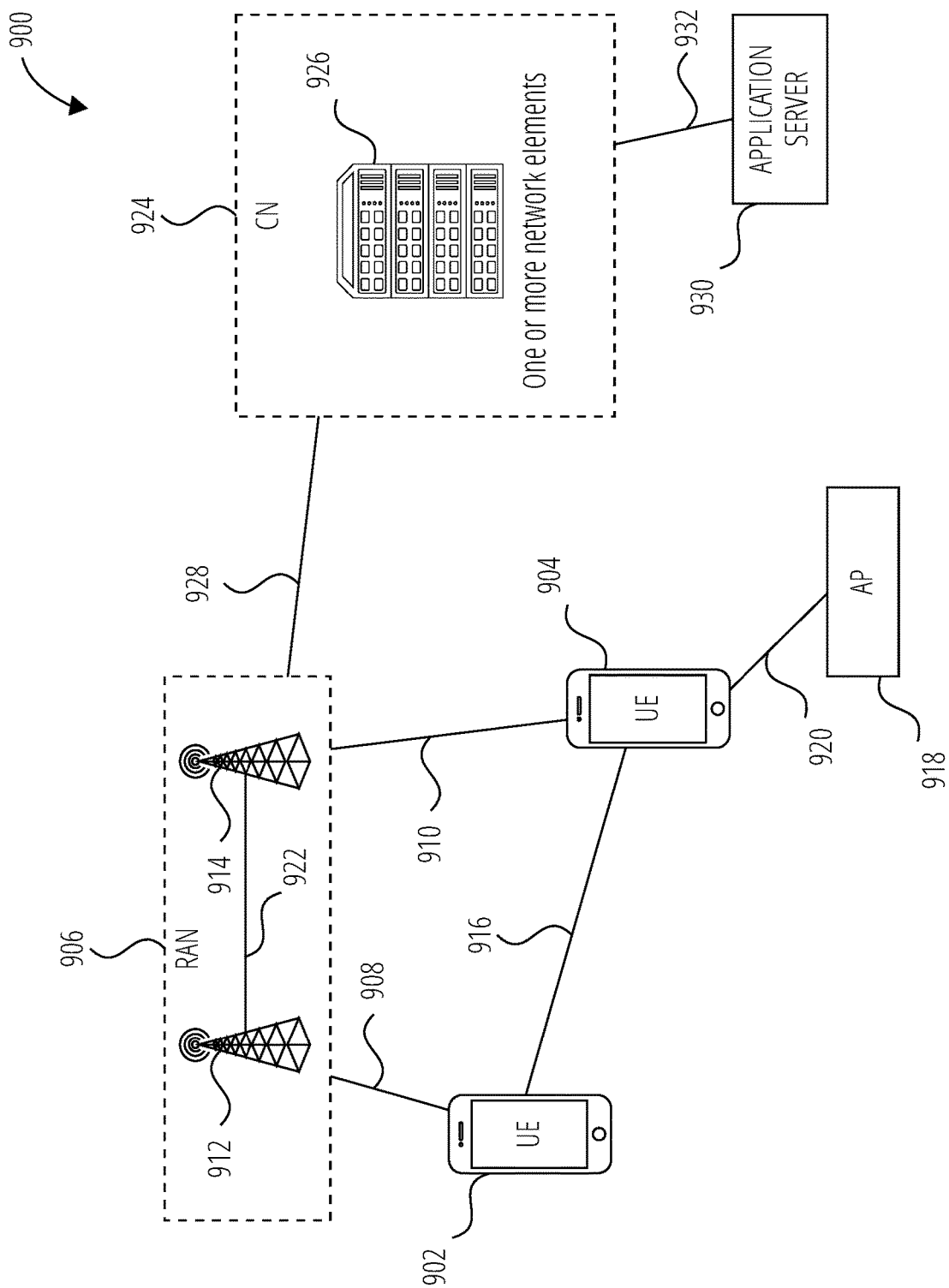
FIG. 9 illustrates an example architecture of a wireless communication system, according to embodiments disclosed herein.

FIG. 9 illustrates an example architecture of a wireless communication system 900, according to embodiments disclosed herein. The following description is provided for an example wireless communication system 900 that operates in conjunction with the LTE system standards and/or 5G or NR system standards as provided by 3GPP technical specifications.

As shown by FIG. 9, the wireless communication system 900 includes UE 902 and UE 904 (although any number of UEs may be used). In this example, the UE 902 and the UE 904 are illustrated as smartphones (e.g., handheld touchscreen mobile computing devices connectable to one or more cellular networks), but may also comprise any mobile or non-mobile computing device configured for wireless communication.

The UE 902 and UE 904 may be configured to communicatively couple with a RAN 906. In embodiments, the RAN 906 may be NG-RAN, E-UTRAN, etc. The UE 902 and UE 904 utilize connections (or channels) (shown as connection 908 and connection 910, respectively) with the RAN 906, each of which comprises a physical communications interface. The RAN 906 can include one or more base stations, such as base station 912 and base station 914, that enable the connection 908 and connection 910.

In this example, the connection 908 and connection 910 are air interfaces to enable such communicative coupling, and may be consistent with RAT(s) used by the RAN 906, such as, for example, an LTE and/or NR.

In some embodiments, the UE 902 and UE 904 may also directly exchange communication data via a sidelink interface 916. The UE 904 is shown to be configured to access an access point (shown as AP 918) via connection 920. By way of example, the connection 920 can comprise a local wireless connection, such as a connection consistent with any IEEE 802.11 protocol, wherein the AP 918 may comprise a Wi-Fi® router. In this example, the AP 918 may be connected to another network (for example, the Internet) without going through a CN 924.

In embodiments, the UE 902 and UE 904 can be configured to communicate using orthogonal frequency division multiplexing (OFDM) communication signals with each other or with the base station 912 and/or the base station 914 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 912 or base station 914 may be implemented as one or more software entities running on server computers as part of a virtual network. In addition, or in other embodiments, the base station 912 or base station 914 may be configured to communicate with one another via interface 922. In embodiments where the wireless communication system 900 is an LTE system (e.g., when the CN 924 is an EPC), the interface 922 may be an X2 interface. The X2 interface may be defined between two or more base stations (e.g., two or more eNBs and the like) that connect to an EPC, and/or between two eNBs connecting to the EPC. In embodiments where the wireless communication system 900 is an NR system (e.g., when CN 924 is a 5GC), the interface 922 may be an Xn interface. The Xn interface is defined between two or more base stations (e.g., two or more gNBs and the like) that connect to 5GC, between a base station 912 (e.g., a gNB) connecting to 5GC and an eNB, and/or between two eNBs connecting to 5GC (e.g., CN 924).

The RAN 906 is shown to be communicatively coupled to the CN 924. The CN 924 may comprise one or more network elements 926, which are configured to offer various data and telecommunications services to customers/subscribers (e.g., users of UE 902 and UE 904) who are connected to the CN 924 via the RAN 906. The components of the CN 924 may be implemented in one physical device or separate physical devices including components to read and execute instructions from a machine-readable or computer-readable medium (e.g., a non-transitory machine-readable storage medium).

In embodiments, the CN 924 may be an EPC, and the RAN 906 may be connected with the CN 924 via an S1 interface 928. In embodiments, the S1 interface 928 may be split into two parts, an S1 user plane (S1-U) interface, which carries traffic data between the base station 912 or base station 914 and a serving gateway (S-GW), and the S1-MME interface, which is a signaling interface between the base station 912 or base station 914 and mobility management entities (MMEs).

In embodiments, the CN 924 may be a 5GC, and the RAN 906 may be connected with the CN 924 via an NG interface 928. In embodiments, the NG interface 928 may be split into two parts, an NG user plane (NG-U) interface, which carries traffic data between the base station 912 or base station 914 and a user plane function (UPF), and the S1 control plane (NG-C) interface, which is a signaling interface between the base station 912 or base station 914 and access and mobility management functions (AMFs).

Generally, an application server 930 may be an element offering applications that use internet protocol (IP) bearer resources with the CN 924 (e.g., packet switched data services). The application server 930 can also be configured to support one or more communication services (e.g., VoIP sessions, group communication sessions, etc.) for the UE 902 and UE 904 via the CN 924. The application server 930 may communicate with the CN 924 through an IP communications interface 932.

Figure 10:
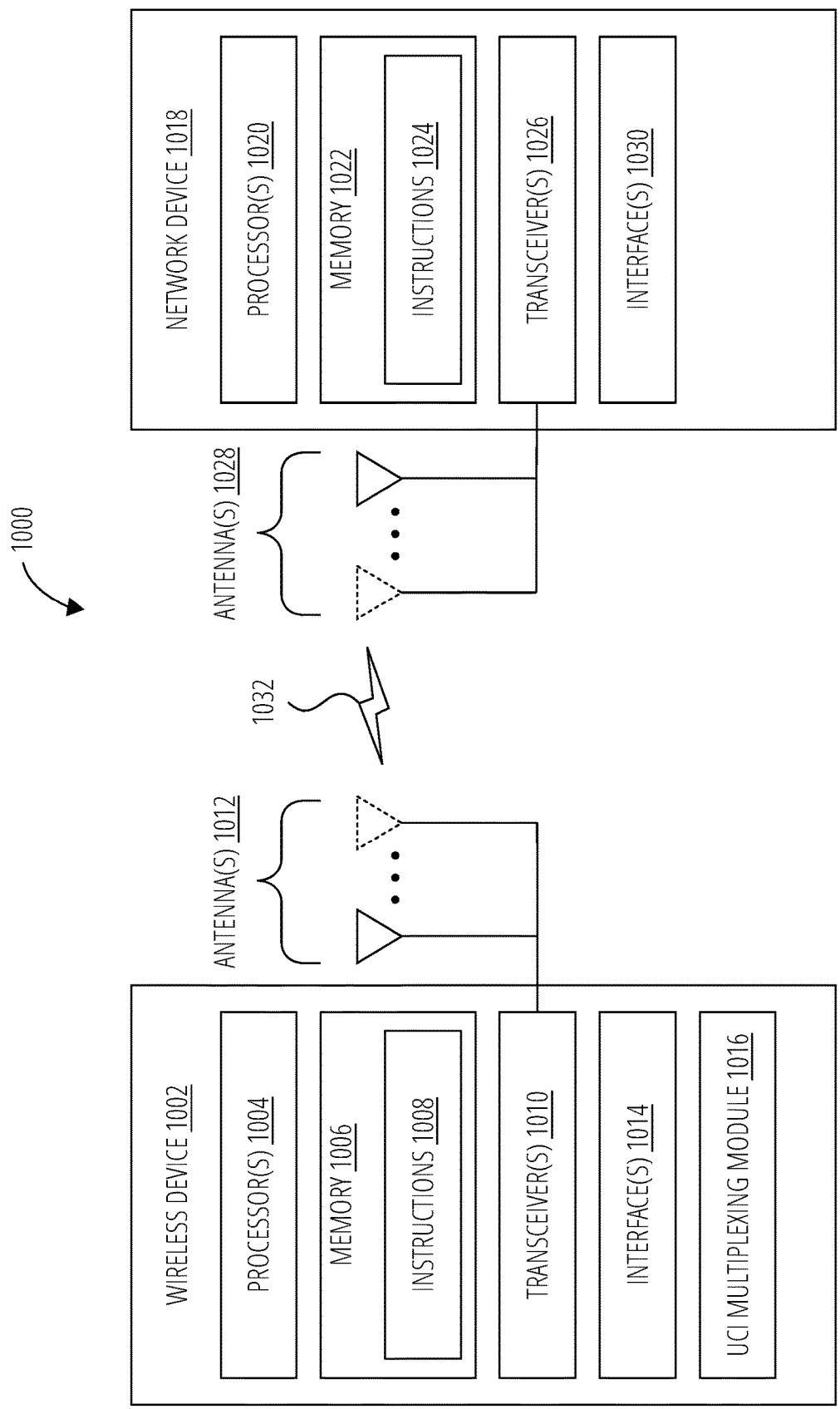
FIG. 10 illustrates a system for performing signaling between a wireless device and a network device, according to embodiments disclosed herein.

FIG. 10 illustrates a system 1000 for performing signaling 1032 between a wireless device 1002 and a network device 1018, according to embodiments disclosed herein. The system 1000 may be a portion of a wireless communications system as herein described. The wireless device 1002 may be, for example, a UE of a wireless communication system.

The network device 1018 may be, for example, a base station (e.g., an eNB or a gNB) of a wireless communication system.

The wireless device 1002 may include one or more processor(s) 1004. The processor(s) 1004 may execute instructions such that various operations of the wireless device 1002 are performed, as described herein. The processor(s) 1004 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1002 may include a memory 1006. The memory 1006 may be a non-transitory computer-readable storage medium that stores instructions 1008 (which may include, for example, the instructions being executed by the processor(s) 1004). The instructions 1008 may also be referred to as program code or a computer program. The memory 1006 may also store data used by, and results computed by, the processor(s) 1004.

The wireless device 1002 may include one or more transceiver(s) 1010 that may include radio frequency (RF) transmitter and/or receiver circuitry that use the antenna(s) 1012 of the wireless device 1002 to facilitate signaling (e.g., the signaling 1032) to and/or from the wireless device 1002 with other devices (e.g., the network device 1018) according to corresponding RATs.

The wireless device 1002 may include one or more antenna(s) 1012 (e.g., one, two, four, or more). For embodiments with multiple antenna(s) 1012, the wireless device 1002 may leverage the spatial diversity of such multiple antenna(s) 1012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1002 may be accomplished according to precoding (or digital beamforming) that is applied at the wireless device 1002 that multiplexes the data streams across the antenna(s) 1012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1002 may implement analog beamforming techniques, whereby phases of the signals sent by the antenna(s) 1012 are relatively adjusted such that the (joint) transmission of the antenna(s) 1012 can be directed (this is sometimes referred to as beam steering).

The wireless device 1002 may include one or more interface(s) 1014. The interface(s) 1014 may be used to provide input to or output from the wireless device 1002. For example, a wireless device 1002 that is a UE may include interface(s) 1014 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1010/antenna(s) 1012 already described) that allow for communication between the UE and other devices and may operate according to known protocols (e.g., Wi-Fi®, Bluetooth®, and the like).

The wireless device 1002 may include a UCI Multiplexing module 1016. The UCI Multiplexing module 1016 may be implemented via hardware, software, or combinations thereof. For example, the UCI Multiplexing module 1016 may be implemented as a processor, circuit, and/or instructions 1008 stored in the memory 1006 and executed by the processor(s) 1004. In some examples, the UCI Multiplexing module 1016 may be integrated within the processor(s) 1004 and/or the transceiver(s) 1010. For example, the UCI Multiplexing module 1016 may be implemented by a combination of software components (e.g., executed by a DSP or a general processor) and hardware components (e.g., logic gates and circuitry) within the processor(s) 1004 or the transceiver(s) 1010.

The UCI Multiplexing module 1016 may be used for various aspects of the present disclosure, for example, aspects of FIGS. 1, 2, 7, and 8. The UCI Multiplexing module 1016 is configured to perform UCI multiplexing in Rel-17, as further described throughout this disclosure.

The network device 1018 may include one or more processor(s) 1020. The processor(s) 1020 may execute instructions such that various operations of the network device 1018 are performed, as described herein. The processor(s) 1004 may include one or more baseband processors implemented using, for example, a CPU, a DSP, an ASIC, a controller, an FPGA device, another hardware device, a firmware device, or any combination thereof configured to perform the operations described herein.

The network device 1018 may include a memory 1022. The memory 1022 may be a non-transitory computer-readable storage medium that stores instructions 1024 (which may include, for example, the instructions being executed by the processor(s) 1020). The instructions 1024 may also be referred to as program code or a computer program. The memory 1022 may also store data used by, and results computed by, the processor(s) 1020.

The network device 1018 may include one or more transceiver(s) 1026 that may include RF transmitter and/or receiver circuitry that use the antenna(s) 1028 of the network device 1018 to facilitate signaling (e.g., the signaling 1032) to and/or from the network device 1018 with other devices (e.g., the wireless device 1002) according to corresponding RATs.

The network device 1018 may include one or more antenna(s) 1028 (e.g., one, two, four, or more). In embodiments having multiple antenna(s) 1028, the network device 1018 may perform MIMO, digital beamforming, analog beamforming, beam steering, etc., as has been described.

The network device 1018 may include one or more interface(s) 1030. The interface(s) 1030 may be used to provide input to or output from the network device 1018. For example, a network device 1018 that is a base station may include interface(s) 1030 made up of transmitters, receivers, and other circuitry (e.g., other than the transceiver(s) 1026/antenna(s) 1028 already described) that enables the base station to communicate with other equipment in a core network, and/or that enables the base station to communicate with external networks, computers, databases, and the like for purposes of operations, administration, and maintenance of the base station or other equipment operably connected thereto.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to perform uplink control information (UCI) multiplexing, the method comprising:
generating physical uplink control channel (PUCCH) resources Z at each of a layer 1 (L1) high priority (HP) procedure and an L1 low priority (LP) procedure, the L1 HP procedure resulting in a plurality of HP PUCCHs and the L1 LP procedure resulting in a plurality of LP PUCCHs;
performing a modified procedure for Set Q to resources Z with the plurality of HP PUCCHs and the plurality of LP PUCCHs as inputs, the modified procedure including at least:
scanning the plurality of HP PUCCHs according to starting symbols to identify an earliest starting HP PUCCH of the plurality of HP PUCCHs;
collecting at least one PUCCH from the plurality of LP PUCCHs or the plurality of HP PUCCHS that overlaps with the earliest starting HP PUCCH;
performing inter-L1 priority multiplexing on the earliest starting HP PUCCH and the at least one collected PUCCH, performing inter-L1 multiplexing resulting in a new HP PUCCH;
inserting the new HP PUCCH into the Set Q; and
repeating the modified procedure until there is no overlap among the plurality of HP PUCCHs and the plurality of LP PUCCHs.

2. The method of claim 1, wherein the new HP PUCCH is different than the earliest starting HP PUCCH.

3. The method of claim 2, wherein the new HP PUCCH starts earlier or ends later than the earliest starting HP PUCCH.

4. The method of claim 3, wherein the at least one collected PUCCH comprises an LP PUCCH of the plurality of LP PUCCHs having a hybrid automatic repeat request-acknowledgement (HARQ-ACK).

5. The method of claim 3, wherein the modified procedure further comprises discarding an LP UCI.

6. The method of claim 2, wherein the new HP PUCCH results in a UCI payload that exceeds a capacity of the earliest starting HP PUCCH.

7. The method of claim 6, wherein the modified procedure further comprises discarding an LP UCI.

8. The method of claim 1, wherein the at least one collected PUCCH comprises an LP PUCCH that includes at least one of a scheduling request (SR) or channel state information (CSI).

9. An apparatus of a user equipment (UE) comprising:
a processor; and
a memory storing instructions that, when executed by the processor, configure the apparatus to:
generate physical uplink control channel (PUCCH) resources Z at each of a layer 1 (L1) high priority (HP) procedure and an L1 low priority (LP) procedure, the L1 HP procedure resulting in a plurality of HP PUCCHs and the L1 LP procedure resulting in a plurality of LP PUCCHs;
perform a modified procedure for Set Q to resources Z with the plurality of HP PUCCHs and the plurality of LP PUCCHs as inputs, the modified procedure including at least to:
scan the plurality of HP PUCCHs according to starting symbols to identify an earliest starting HP PUCCH of the plurality of HP PUCCHs;
collect at least one PUCCH from the plurality of LP PUCCHs or the plurality of HP PUCCHs that overlaps with the earliest starting HP PUCCH;
perform inter-L1 priority multiplexing on the earliest starting HP PUCCH and the at least one collected PUCCH, performing inter-L1 multiplexing resulting in a new HP PUCCH;

insert the new HP PUCCH into the Set Q; and repeat the modified procedure until there is no overlap among the plurality of HP PUCCHs and the plurality of LP PUCCHs.

10. The apparatus of claim 9, wherein the new HP PUCCH is different than the earliest starting HP PUCCH.

11. The apparatus of claim 10, wherein the new HP PUCCH starts earlier or ends later than the earliest starting HP PUCCH.

12. The apparatus of claim 11, wherein the modified procedure further comprises discarding an LP UCI.

13. The apparatus of claim 10, wherein the at least one collected PUCCH comprises an LP PUCCH of the plurality of LP PUCCHs having a hybrid automatic repeat request-acknowledgement (HARQ-ACK).

14. The apparatus of claim 10, wherein the new HP PUCCH results in a UCI payload that exceeds a capacity of the earliest starting HP PUCCH.

15. The apparatus of claim 10, wherein the modified procedure further comprises discarding an LP UCI.

16. The apparatus of claim 9, wherein the at least one collected PUCCH comprises an LP PUCCH that includes at least one of a scheduling request (SR) or channel state information (CSI).

17. A non-transitory computer-readable storage medium, the computer-readable storage medium including instructions that when executed by a processor of a user equipment, cause the processor to:

generate physical uplink control channel (PUCCH) resources Z at each of a layer 1 (L1) high priority (HP) procedure and an L1 low priority (LP) procedure, the L1 HP procedure resulting in a plurality of HP PUCCHs and the L1 LP procedure resulting in a plurality of LP PUCCHs;

perform a modified procedure for Set Q to resources Z with the plurality of HP PUCCHs and the plurality of LP PUCCHs as inputs, the modified procedure including at least to:

scan the plurality of HP PUCCHs according to starting symbols to identify an earliest starting HP PUCCH of the plurality of HP PUCCHs;

collect at least one PUCCH from the plurality of LP PUCCHs or the plurality of HP PUCCHs that overlaps with the earliest starting HP PUCCH;

perform inter-L1 priority multiplexing on the earliest starting HP PUCCH and the at least one PUCCH, performing inter-L1 multiplexing resulting in a new HP PUCCH;

insert the new HP PUCCH into the Set Q; and repeat the modified procedure until there is no overlap among the plurality of HP PUCCHs and the plurality of LP PUCCHs.

18. The non-transitory computer-readable storage medium of claim 17, wherein the new HP PUCCH is different than the earliest starting HP PUCCH.

19. The non-transitory computer-readable storage medium of claim 18, wherein the new HP PUCCH starts earlier or ends later than the earliest starting HP PUCCH.

20. The non-transitory computer-readable storage medium of claim 19, wherein the modified procedure further comprises discarding an LP UCI.

\* \* \* \* \*